(12) United States Patent
Mitsutani (10) Patent No.: US 10,011,184 B2
(45) Date of Patent: Jul. 3, 2018

(54) POWER SUPPLY SYSTEM FOR VEHICLE

(71) Applicant: Noritake Mitsutani, Toyota (JP)

(72) Inventor: Noritake Mitsutani, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 312 days.

(21) Appl. No.: 14/435,530

(22) PCT Filed: Oct. 10, 2013

(86) PCT No.: PCT/IB2013/002250
§ 371 (c)(1),
(2) Date: Apr. 14, 2015

(87) PCT Pub. No.: WO2014/060812
PCT Pub. Date: Apr. 24, 2014

(65) Prior Publication Data
US 2015/0298568 A1 Oct. 22, 2015

(30) Foreign Application Priority Data
Oct. 16, 2012 (JP) ................. 2012-228864

(51) Int. Cl.
*B60L 1/00* (2006.01)
*B60L 11/18* (2006.01)
(Continued)

(52) U.S. Cl.
CPC .......... *B60L 11/1851* (2013.01); *B60K 6/445* (2013.01); *B60L 11/126* (2013.01); *B60L 11/14* (2013.01); *B60L 11/1811* (2013.01); *B60L 11/1812* (2013.01); *B60L 11/1816* (2013.01); *B60L 11/1838* (2013.01);
(Continued)

(58) Field of Classification Search
CPC ............. Y02T 10/7072; Y02T 10/7005; Y02T 10/7044; Y02T 90/14; B60L 11/1868
See application file for complete search history.

(56) References Cited

U.S. PATENT DOCUMENTS 6,771,045 B1 * 8/2004 Keller ................. H01M 10/441
320/118
2005/0122071 A1 6/2005 King et al.
(Continued)

FOREIGN PATENT DOCUMENTS

EP 2441632 A1 4/2012
JP H07-111711 A 4/1995
(Continued)

*Primary Examiner* — Sibin Chen
(74) *Attorney, Agent, or Firm* — Hunton Andrews Kurth LLP (57) ABSTRACT

A power supply system for a vehicle, which executes the following control, is provided. When a connector coupled to an external power supply is connected to the vehicle, a CHR is set to an on state. When a voltage is lower than a threshold, B2 charging process is executed. When the voltage is higher than the threshold and an SOC1 of a first battery is lower than a threshold, a charging device is stopped and both a first SMR and a second SMR are set to an on state, and B1 charging process is executed. When the SOC1 is higher than or equal to the threshold, the charging device is stopped and both the first SMR and the second SMR are set to an off state.

10 Claims, 6 Drawing Sheets

(51) Int. Cl.

| | | |
|---|---|---|
| *B60L 11/12* | (2006.01) | |
| *B60L 11/14* | (2006.01) | |
| *H02J 7/00* | (2006.01) | |
| *B60W 10/26* | (2006.01) | |
| *B60K 6/445* | (2007.10) | |
| *B60R 16/033* | (2006.01) | |

(52) U.S. Cl.
CPC ....... *B60L 11/1859* (2013.01); *B60L 11/1862* (2013.01); *B60L 11/1868* (2013.01); *B60R 16/033* (2013.01); *B60W 10/26* (2013.01); *H02J 7/0021* (2013.01); *H02J 7/0054* (2013.01); *B60L 2210/12* (2013.01); *B60L 2210/14* (2013.01); *B60L 2220/14* (2013.01); *B60L 2240/547* (2013.01); *B60L 2240/549* (2013.01); *Y02T 10/6217* (2013.01); *Y02T 10/6239* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 10/7225* (2013.01); *Y02T 10/7233* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y10S 903/907* (2013.01)

(56) References Cited

U.S. PATENT DOCUMENTS

| | | | |
|---|---|---|---|
| 2010/0019729 | A1 | 1/2010 | Kaita et al. |
| 2010/0228413 | A1* | 9/2010 | Fujitake ................. B60L 11/14 701/22 |
| 2013/0020983 | A1 | 1/2013 | Ishikawa et al. |

FOREIGN PATENT DOCUMENTS

| | | |
|---|---|---|
| JP | 2006-121874 A | 5/2006 |
| JP | 2006-136119 A | 5/2006 |
| JP | 2010-029051 A | 2/2010 |
| JP | 2010-115050 A | 5/2010 |
| JP | 2010-124535 A | 6/2010 |
| JP | 2011-199934 A | 10/2011 |
| JP | 2012-039864 A | 2/2012 |
| JP | 2012-234697 A | 11/2012 |

* cited by examiner

POWER SUPPLY SYSTEM FOR VEHICLE

CROSS-REFERENCE TO RELATED APPLICATIONS

This is a national phase application based on the PCT International Patent Application No. PCT/IB62013/002250 filed Oct. 10, 2013, claiming priority to Japanese Patent Application No. 2012-228864 filed Oct. 16, 2012, the entire contents of both of which are incorporated herein by reference.

BACKGROUND OF THE INVENTION

1. Field of the Invention

The invention relates to a technique for charging a plurality of electrical storage devices, mounted on a vehicle, with the use of an external power supply.

2. Description of Related Art

For example, Japanese Patent Application Publication No. 2011-199934 (JP 2011-199934 A) describes a power supply system that includes a first secondary battery that is chargeable with the use of an external power supply, a second secondary battery that is connected in parallel with the first secondary battery, and a step-up converter that is connected between the first secondary battery and the second secondary battery and that changes an electric power supplied from the second secondary battery to a motor generator on the basis of a required electric power of the motor generator. Japanese Patent Application Publication No. 2010-029051 (JP 2010-029051 A) and Japanese Patent Application Publication No. 2010-124535 (JP 2010-124535 A) also describe a power supply system.

Incidentally, when a plurality of electrical storage devices mounted on a vehicle are charged with the use of an external power supply, the electrical storage devices need to be efficiently charged in a short period of time. JP 2011-199934 A describes that the first secondary battery is charged with the use of the external power supply and the second secondary battery is charged with the use of the first secondary battery, but it does not consider improvement in charging efficiency and reduction in charging time at all, so there is room for improvement.

SUMMARY OF THE INVENTION

The invention provides a power supply system for a vehicle, which efficiently charges a plurality of electrical storage devices, mounted on the vehicle, with the use of an external power supply in a short period of time.

An aspect of the invention provides a power supply system for a vehicle, which includes a first electrical storage device, a converter, a second electrical storage device, a charging device and a control device. The first electrical storage device is a power supply source to an electrical load that is a drive source of the vehicle. The converter is configured to bidirectionally adjust a voltage between the first electrical storage device and an electrical load. The second electrical storage device is a power supply source connected to the electrical load in parallel with the converter. The charging device is connected to the converter in parallel with the second electrical storage, device and configured to charge at least one of the first electrical storage device and the second electrical storage device with the use of a power supply outside the vehicle. The control device is configured to control the converter such that the first electrical storage device is charged using electric power from the second electrical storage device and electric power from the charging device.

The control device may be configured to control the converter such that at least one of an allowable value of discharging power of the second electrical storage device and an allowable value of charging power of the first electrical storage device is not exceeded, when the first electrical storage device is charged using electric power from the second electrical storage device and electric power from the charging device.

The control device may be configured to charge the second electrical storage device with the use of the charging device before the first electrical storage device is charged, when a remaining level of the second electrical storage device is lower than a threshold.

The power supply system may further include a first switch configured to electrically interrupt the first electrical storage device from the converter when a remaining level of the first electrical storage device is higher than or equal to a threshold and the first electrical storage device is charged.

The power supply system may further include a second switch configured to electrically interrupt the charging device from the converter, when the second electrical storage device is charged with the use of the charging device.

The control device may be configured to execute control with a standby time at the time when the first switch or the second switch is switched to be disconnected or connected.

The control device may be configured to control the converter and the charging device such that at least one of an allowable value of discharging power of the second electrical storage device and an allowable value of charging power of the first electrical storage device is not exceeded, when the first electrical storage device is charged using electric power from the second electrical storage device and electric power from the power supply outside the vehicle.

The first electrical storage device may be a secondary battery having a higher output density than the second electrical storage device. The second electrical storage device may be a secondary battery having a higher capacitance density than the first electrical storage device.

With the thus configured power supply system for a vehicle, it is possible to complete charging of the first electrical storage device in a short period of time by charging the first electrical storage device using electric power from the second electrical storage device and electric power from the charging device as compared to when the first electrical storage device is charged with the use of only the charging device. Therefore, it is possible to reduce a period during which a loss occurs in the converter, or the like, during charging, so it is possible to improve charging efficiency. Thus, it is possible to provide the power supply system for a vehicle, which efficiently charges the plurality of electrical storage devices, mounted on the vehicle, in a short period of time with the use of the external power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. In the following description, like reference numerals denote the same components. Those names and functions are also the same. Thus, the detailed description thereof will not be repeated.

Figure 1:
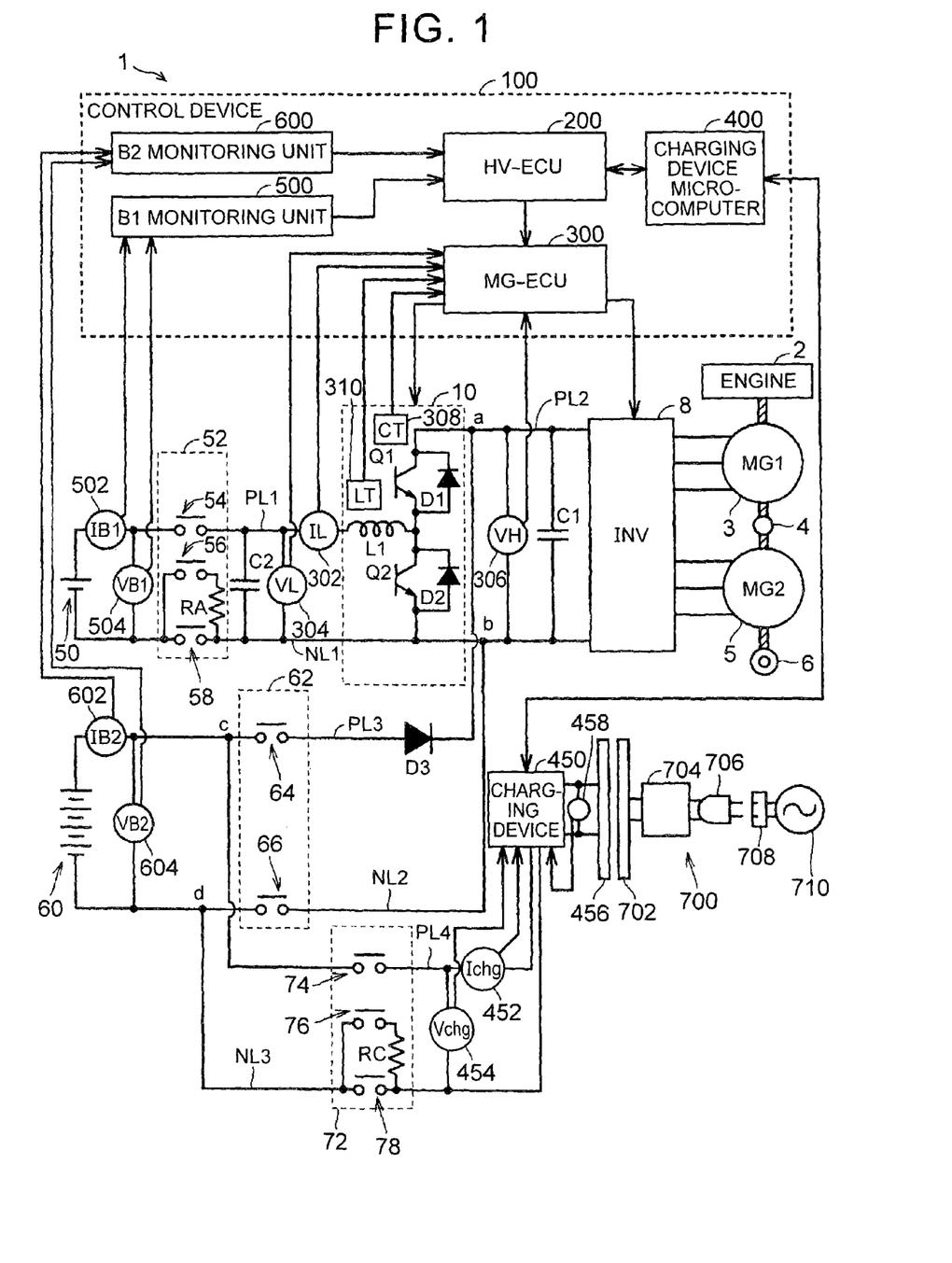
FIG. 1 is a block diagram that shows the configuration of a vehicle according to an embodiment.

FIG. 1 shows the overall block diagram of a vehicle according to the present embodiment. The vehicle according to the present embodiment will be, for example, described as a hybrid vehicle that uses an engine and a motor generator as drive sources; however, the vehicle is not specifically limited to a hybrid vehicle that uses an engine and a motor generator as drive sources. The vehicle may be, for example, a hybrid vehicle or an electromotive vehicle that uses only a motor generator as a drive source.

As shown in FIG. 1, a hybrid vehicle in the following description, simply referred to as vehicle) 1 includes an engine 2, a first motor generator (hereinafter, referred to as first MG) 3, a power split mechanism 4, a second motor generator (hereinafter, referred to as second MG) 5, a wheel 6, an inverter 8, a converter 10, a first battery 50, a first system main relay (hereinafter, referred to as first SMR) 52, a second battery 60, a second system main relay (hereinafter, referred to as second SMR) 62 a charging relay (hereinafter, referred to as CHR) 72, a control device 100, current sensors 302, 452, 502, 602, voltage sensors 304, 306, 454, 504, 604, temperature sensors 308, 310, a charging device 450, capacitors C1, C2, a diode D3, positive electrode lines PL1, PL2, PL3, PL4 and negative electrode lines NL1, NL2, NL3.

A power supply system of the vehicle 1 according to the present embodiment includes the converter 10, the first battery 50, the second battery 60, the control device 100 and the charging device 450.

The vehicle 1 travels with the use of the engine 2 and the second MG 5 as power sources. The power split mechanism 4 is coupled to the engine 2, the first MG 3 and the second MG 5, and distributes power among these elements. The power split mechanism 4 is, for example, formed of a planetary gear unit having three rotary shafts, that is, a sun gear, a carrier and a ring gear, and the three rotary shafts are respectively connected to the rotary shafts of the engine 2, first MG 3 and second MG 5. When the rotor of the first MG 3 is formed in a hollow shape and then the crankshaft of the engine 2 is passed through the center of the rotor, the engine 2, the first MG 3 and the second MG 5 are allowed to be mechanically connected to the power split mechanism 4. The rotary shaft of the second MG 5 is coupled to the wheel 6 via a reduction gear (not shown) or a differential gear (not shown). The first MG 3 is assembled in the vehicle 1, operates as a power generator that is driven by the engine 2, and operates as an electric motor that can start the engine 2. The second MG 5 is assembled in the vehicle 1 as an electric motor that drives the wheel 6.

The engine 2 is able to cause the vehicle 1 to travel together with the second MG 5 in parallel by burning fuel, such as gasoline, or is able to cause the vehicle 1 to travel only by the engine 2 itself.

Each of the first battery 50 and the second battery 60 is a chargeable and dischargeable electrical storage device, and is, for example, a secondary battery, such as a nickel metal hydride battery and a lithium ion battery. A large-capacitance capacitor may be used instead of one of the first battery 50 and the second battery 60 or both of the first battery 50 and the second battery 60.

The first battery 50 supplies electric power to the converter 10 when the vehicle 1 is driven, and is charged with electric power supplied from the converter 10 at the time of regeneration of electric power. The first battery 50 and the converter 10 are connected to each other by the positive electrode line PL1 and the negative electrode line NL1. One end of the positive electrode line PL1 is connected to the positive electrode terminal of the first battery 50, and one end of the negative electrode line NL1 is connected to the negative electrode terminal of the first battery 50. The other end of the positive electrode line PL1 is connected to the converter 10. The other end of the negative electrode line NL1 is connected to the inverter 8 via the converter 10. The first SMR 52 is provided at a predetermined location in the positive electrode line PL1 and the negative electrode line NL1 between the first battery 50 and the converter 10.

The first SMR 52 switches a state of conduction between the first battery 50 and the converter 10 from one of a conductive state (on state) and a non-conductive state (off state) to the other state on the basis of a signal received from the control device 100.

When the first SMR 52 enters the on state, an exchange of electric power is enabled via the positive electrode line PL1 and the negative electrode line NL1 between the first battery 50 and the converter 10.

On the other hand, when the first SMR 52 enters the off state, the first battery 50 is isolated from the converter 10, so an exchange of electric power is disabled between the first battery 50 and the converter 10.

The first SMR 52 includes a first SMRB 54, a first SMRP 56, a first SMRG 58 and a limiting resistor RA. The first SMRB 54 is provided in the positive electrode line PL1, and switches the positive electrode line PL1 from at least one of a conductive state and a non-conductive state to the other state. The first SMRG 58 is provided in the negative electrode line NL1, and switches the negative electrode line NL1 from at least one of a conductive state and a non-conductive state to the other state. The first SMRP 56 is connected in series with the limiting resistor RA. The first SMRP 56 and the limiting resistor RA are connected in the negative electrode line NL1 in parallel with the first SMRG 58.

When the first SMR 52 is switched from the off state to the on state, each of the first SMRB 54 and the first SMRP 56 is initially switched from an off state to an on state in order to prevent welding of the components of the first SMR 52 as a result of flow of large current immediately after the first SMR 52 enters the on state. As each of the first SMRB 54 and the first SMRP 56 enters the on state, output current from the first battery 50 to the converter 10 occurs. At this time, excessive output current is suppressed by the limiting resistor RA connected in series with the first SMRP 56. Therefore, a voltage VL gradually increases. When the voltage VL increases and then becomes substantially equal to the voltage of the first battery 50, the first SMRP 56 is switched so as to enter the off state, and the first SMRG 58 is switched so as to enter the on state.

When the first SMR 52 is switched from the on state to the off state, each of the first SMRB 54 and the first SMRG 58 is switched from the on state to the off state.

The second battery 60 is connected to an electrical load (the inverter 8, the first MG 3 and the second MG 5) in parallel with the converter 10. The electrical load and the converter 10 are connected to each other by the positive electrode line PL2 and the negative electrode line NL1. One end of the positive electrode line PL3 is connected to the positive electrode terminal of the second battery 60. One end of the negative electrode line NL2 is connected to the negative electrode terminal of the second battery 60. The other end of the positive electrode line PL3 is connected to a first connection node a located in the positive electrode line PL2. The other end of the negative electrode line NL2 is connected to a second connection node b located in the negative electrode line NL1. The second SMR 62 is provided at a predetermined location in the positive electrode line PL3 and the negative electrode line NL2.

The second SMR 62 switches a state of conduction between the second battery 60 and both the first connection node a and the second connection node b from one of a conductive state (on state) and a non-conductive state (off state) to the other state on the basis of a signal received from the control device 100.

When the second SMR 62 enters the on state, an exchange of electric power is enabled via the positive electrode line PL3 and the negative electrode line NL2 between the second battery 60 and both the first connection node a and the second connection node b.

On the other hand, when the second SMR 62 enters the off state, the second battery 60 is isolated from both the first connection node a and the second connection node b, and an exchange of electric power is disabled between the second battery 60 and both the first connection node a and the second connection node b.

The second SMR 62 includes a second SMRB 64 and a second SMRG 66. The second SMRB 64 is provided in the positive electrode line PL3, and switches the positive electrode line PL3 from at least one of a conductive state and a non-conductive state to the other state. The second SMRG 66 is provided in the negative electrode line NL2, and switches the negative electrode line NL2 from at least one of a conductive state and a non-conductive state to the other state.

When the second SMR 62 is switched from the off state to the on state, the second SMRB 64 and the second SMRG 66 both are switched so as to enter the on state. When the second SMR 62 is switched from the on state to the off state, the second SMRB 64 and the second SMRG 66 both are switched so as to enter the off state.

The diode D3 is provided between the first connection node a and the second SMRB 64. The anode of the diode D3 is connected to the second SMRB 64. The cathode of the diode D3 is connected to the first connection node a. The diode D3 suppresses supply of electric power from the converter 10 or an electrical load side to the second battery 60.

The dischargeable capacity of each of the first battery 50 and the second battery 60 is set such that each of the first battery 50 and the second battery 60 is, for example, able to output a maximum power allowed by the electrical load (the inverter 8 and the second MG 5) by using the first battery 50 and the second battery 60 at the same time. Thus, the vehicle is able to travel at a maximum power in an electric vehicle (EV) traveling mode in which the engine 2 is not used.

When electric power stored in the second battery 60 has been consumed, the vehicle is able to travel at a maximum power using the power of the engine 2 in addition to the electric power of the first battery 50 even when the second battery 60 is not used.

In the present embodiment, the first battery 50 is a high-power battery having a higher output density than the second battery 60. On the other hand, the second battery 60 is a high-capacitance battery having a higher capacitance density than the first battery 50. In the present embodiment, the voltage of the second battery 60 is higher than the voltage of the first battery 50.

The converter 10 steps up the voltage level of electric power, which is supplied from the first battery 50 on the basis of a command signal from an MG-ECU 300, to a target level, and outputs the voltage, stepped up to the target level, to the positive electrode line PL2. In addition, the converter 10 steps down the voltage level of regenerated electric power, which is supplied from the inverter 8 via the positive electrode line PL2, or charging power, which is supplied from the second battery 60 or the charging device 450 via the positive electrode lines PL3, PL2, to the voltage level of the first battery 50 on the basis of a command signal received from the MG-ECU 300, and charges the first battery 50. Furthermore, the converter 10 stops switching operation when the converter 10 receives a command signal indicating stop of operation from the MG-ECU 300. Moreover, when the converter 10 receives a command signal from the MG-ECU 300 to cause an upper arm to enter an on state, the converter 10 fixes the upper arm (corresponding to a switching element Q1 (described later)) and a lower arm (corresponding to a switching element Q2 (described later)), which are included in the converter 10, in an on state and an off state, respectively.

The converter 10 includes the power semiconductor switching elements (in the following description, simply referred to as switching elements) Q1, Q2, diodes D1, D2 and a reactor L1.

In the present embodiment, insulated gate bipolar transistors (IGBTs) are employed as the switching elements Q1, Q2; however, any switching elements are applicable as long as the switching elements are able to undergo on/off control on the basis of command signals. For example, metal oxide semiconductor field effect transistors (MOSFETs), bipolar transistors, and the like, are also applicable.

The switching elements Q1, Q2 are serially connected between the positive electrode line PL2 and the negative electrode line NL1. The diodes D1, D2 are respectively connected in antiparallel with the switching elements Q1, Q2. One end of the reactor L1 is connected to a connection node of the switching elements Q1, Q2, and the other end of the reactor L1 is connected to the positive electrode line PL1. The switching element Q1 corresponds to the upper arm of the converter 10, and the switching element Q2 corresponds to the lower arm of the converter 10.

The converter 10 is formed of a chopper circuit. The converter 10 steps up the voltage of the positive electrode line PL1 with the use of the reactor L1 on the basis of a command signal received from the MG-ECU 300, and outputs the stepped-up voltage to the positive electrode line PL2.

At this time, the MG-ECU 300 controls the step-up ratio of output voltage from the first battery 50 by controlling the on/off period ratio (duty ratio) of the switching element Q1 and/or the switching element Q2.

On the other hand, the converter 10 steps down the voltage of the positive electrode line PL2 on the basis of a command signal received from the MG-ECU 300, and outputs the stepped-down voltage to the positive electrode line PL1.

At this time, the MG-ECU 300 controls the step down ratio of the voltage of the positive electrode line PL2 by controlling the on/off period ratio (duty ratio) of the switching element Q1 and/or the switching element Q2.

The capacitor C1 is connected between the positive electrode line PL2 and the negative electrode line NL1, and smoothes voltage fluctuations between the positive electrode line PL2 and the negative electrode line NL1. The capacitor C2 is connected between the positive electrode line PL1 and the negative electrode line NL1, and smoothes voltage fluctuations between the positive electrode line PL1 and the negative electrode line NL1.

When the first MG 3 is driven; the inverter 8 converts direct-current voltage from the positive electrode line PL2 to three-phase alternating-current voltages on the basis of a command signal from the MG-ECU 300, and outputs the converted alternating-current voltages to the first MG 3.

When the first MG 3 generates electric power, the inverter 8 converts three-phase alternating-current voltages, generated by the first MG 3 using the power of the engine 2, to direct-current voltage on the basis of a command signal received from the MG-ECU 300, and outputs the converted direct-current voltage to the positive electrode line PL2.

When the vehicle travels in the EV traveling mode, the inverter 8 converts direct-current voltage from the positive electrode line PL2 to three-phase alternating-current voltages on the basis of a command signal received from the MG-ECU 300, and outputs the converted alternating-current voltages to the second MG 5.

When the vehicle 1 carries out regenerative braking, the inverter 8 converts three-phase alternating-current voltages, generated by the second MG 5 through rotational force input from the wheel 6, to direct-current voltage on the basis of a command signal received from the MG-ECU 300, and outputs the converted direct-current voltage to the positive electrode line PL2.

Each of the first MG 3 and the second MG 5 is a three-phase alternating-current rotary electric machine, and is, for example, formed of a three-phase alternating-current synchronous motor. The first MG 3 outputs three-phase alternating-current voltages, generated using the power of the engine 2, to the inverter 8. In addition, the first MG 3 is driven by the inverter 8 to crank the engine 2 when the engine 2 is started.

The second MG 5 is driven by the inverter 8 to generate driving force for driving the vehicle 1. In addition, when the vehicle 1 carries out regenerative braking, the second MG 5 outputs three-phase alternating-current voltages, generated using rotational force received from the wheel 6, to the inverter 8.

The current sensor 302 detects a current IL flowing through the reactor L1 of the converter 10, and outputs the detected current IL to the MG-ECU 300. The voltage sensor 304 detects the voltage VL between the terminals of the capacitor C2, and outputs the detected voltage VL to the MG-ECU 300. The voltage sensor 306 detects a voltage VH between the terminals of the capacitor C1, and outputs the detected voltage VH to the MG-ECU 300.

The temperature sensor 308 detects a temperature (hereinafter, referred to as converter temperature) CT of the converter 10, and outputs the detected converter temperature CT to the MG-ECU 300. The converter temperature CT is, for example, the temperature of an element that constitutes the converter 10, such as the switching element Q1 and the switching element Q2, other than the reactor L1.

The temperature sensor 310 detects a temperature (hereinafter, referred to as reactor temperature) LT of the reactor L1, and outputs the detected reactor temperature LT to the MG-ECU 300.

The current sensor 452 detects a current Ichg flowing through the positive electrode line PL4, and outputs the detected current Ichg to the charging device 450. The voltage sensor 454 detects a voltage Vchg between the positive electrode line PL4 and the negative electrode line NL3, and outputs the detected voltage Vchg to the charging device 450. The voltage sensor 458 detects an alternating-current voltage VAC, input to the charging device 450, and outputs the detected alternating-current voltage VAC to the charging device 450. The charging device 450 outputs the received detected results to the control device 100. The current sensor 452 and the voltage sensors 454, 458 may directly output the detected results to the control device 100 instead of the charging device 450.

The current sensor 502 detects a current IB1 flowing through the positive electrode line PL1, and outputs the detected current IB1 to a B1 monitoring unit 500. The voltage sensor 504 detects a voltage VB1 of the first battery 50, and outputs the detected voltage VB1 to the B1 monitoring unit 500.

The current sensor 602 detects a current IB2 flowing through the positive electrode line PL3, and outputs the detected current IB2 to a B2 monitoring unit 600. The voltage sensor 604 detects a voltage VB2 of the second battery 60, and outputs the detected voltage VB2 to the B2 monitoring unit 600.

An auxiliary battery (not shown) is connected to the positive electrode line PL1 and the negative electrode line NL1 via a DC/DC converter (not shown). The DC/DC converter steps down the direct-current voltage of the positive electrode line PL1 on the basis of a signal received from the control device 100, and charges the auxiliary battery. The auxiliary battery supplies electric power to auxiliaries (not shown) mounted on the vehicle 1. The auxiliaries are, for example, head lights, a clock, an audio device, various ECUs, and the like; however, the types of auxiliaries are not limited. The auxiliary battery is a chargeable and dischargeable electrical storage device, and is, for example, a lead-acid battery.

The charging device 450 is connected to the converter 10 in parallel with the second battery 60. One end of the positive electrode line PL4 is connected to the positive electrode terminal of the charging device 450. One end of the negative electrode line NL3 is connected to the negative electrode terminal of the charging device 450. The other end of the positive electrode line PL4 is connected to a third connection node c located in the positive electrode line PL3. The other end of the negative electrode line NL3 is connected to a fourth connection node d located in the negative electrode line NL2.

The charging device 450 charges at least one of the first battery 50 and the second battery 60 using electric power supplied from a power supply 710 (in the following description, referred to as external power supply) 710 outside the vehicle 1 or stops the charging on the basis of a command signal received from the control device 100.

An inlet 456 is connected to the charging device 450. The inlet 456 is provided at the side portion of the vehicle 1, and has a shape connectable to a connector 702 provided at one end of a charging cable 700. A plug 706 is provided at the other end of the charging cable 700. The plug 706 is connected to an outlet 708 provided at the external power supply 710.

The external power supply 710 is, for example, an alternating-current power supply. The alternating-current power supply is, for example, a commercial power supply that is supplied from an electric utility to a house.

When the inlet 456 and the external power supply 710 are connected by the charging cable 700, the alternating-current power of the external power supply 710 is allowed to be supplied to the charging device 450. The alternating-current power supplied from the external power supply 710 is converted by the charging device 450 to direct-current power, and is, output to the positive electrode line PL4 and the negative electrode line NL3.

A switch is provided at the connector 702. When the connector 702 is connected to the inlet 456, the switch becomes a closed state. At this time, a signal that indicates that the switch is in a closed state is transmitted from the switch to the control device 100. When the control device 100 receives the signal that indicates that the switch is in a closed state, the control device 100 determines that the connector 702 is connected to the inlet 456. The switch opens or closes in synchronization with a restricting member that restricts the position of the connector 702 in a state where the connector 702 is connected to the inlet 456.

The plug 706 has a shape connectable to the outlet 708 provided at a house. Alternating-current power from the external power supply 710 is supplied to the outlet 708.

The charging cable 700 further includes a charging circuit interrupt device (CCID) 704 in addition to the connector 702 and the plug 706.

The CCID 704 has a relay and a control pilot circuit. In a state where the relay is open, a path through which electric power is supplied from the external power supply 710 to the inlet 456 is interrupted. In a state where the relay is closed, electric power is allowed to be supplied from the external power supply 710 to the inlet 456. The state of the relay is controlled by the control device 100 in a state where the connector 702 is connected to the inlet 456.

The control pilot circuit transmits a pilot signal (rectangular wave signal) CPLT to a control pilot line in a state where the plug 706 is connected to the outlet 708 and the connector 702 is connected to the inlet 456. The pilot signal CPLT is periodically varied by a transmitter provided in the control pilot circuit.

When the plug 706 is connected to the outlet 708 and the connector 702 is connected to the inlet 456, the control pilot circuit generates the pilot signal CPLT having a predetermined pulse width (duty cycle). The pulse width of the pilot signal CPLT inset for each type of the charging cable.

The generated pilot signal CPLT is transmitted to an HV-ECU 200. The pilot signal CPLT may be, for example, transmitted from the CCID 704 to the HV-ECU 200 via the connector 702, the charging device 450 and a charging device microcomputer. The HV-ECU 200 determines a current capacity, at or below which current is allowed to be supplied from the charging cable 700 to the vehicle 1, on the basis of the pulse width of the received pilot signal CPLT.

The CHR 72 is provided in the positive electrode line PL4 and the negative electrode line NL3. The CHR 72 switches a state of conduction between the charging device 450 and both the third connection node c and the fourth connection node d from at least one of a conductive state (on state) and an interrupted state (off state) to the other state on the basis of a signal received from the control device 100.

In a state where the inlet 456 and the external power supply 710 are connected by the charging cable 700, when the CHR 72 enters the on state, electric power supplied from the external power supply 710 is allowed to be output to between the positive electrode line PL4 and the negative electrode line NL3 via the inlet 456 and the charging device 450. When the CHR 72 enters the off state, a state of conduction between the positive electrode terminal of the charging device 450 and the third connection node c and a state of conduction between the negative electrode terminal of the charging device 450 and the fourth connection node d each enter a power interrupted state.

The CHR 72 has a configuration similar to the first SMR 52. That is, a configuration that the first battery 50 is replaced with the charging device 450, the first SMRB 54, the first SMRP 56, the first SMRG 58 and the limiting resistor RA are respectively replaced with a CHRB 74, a CHRP 76, a CHRG 78 and a limiting resistor RC in the configuration of the above-described first SMR 52 corresponds to the configuration of the CHR 72.

When the CHR 72 is switched from the off state to the on state, each of the CHRB 74 and the CHRP 76 is switched from the off state to the on state. After that, the CHRP 76 is switched from the on state to the off state, and the CHRG 78 is switched from the off state to the on state.

The control device 100 generates command signals for controlling the inverter 8, the converter 10, the first SMR 52, the second SMR 62, the CHR 72 and the charging device 450, and outputs the generated command signals to the devices to be controlled. The control device 100 includes the HV-ECU 200, the MG-ECU 300, the charging device microcomputer 400, the B1 monitoring unit 500 and the B2 monitoring unit 600.

The B1 monitoring unit 500 receives the detected current IB1 from the current sensor 502 and, the detected voltage VB1 from the voltage sensor 504. The B1 monitoring unit 500 transmits these detected values to the HV-ECU 200. The B1 monitoring unit 500 may, for example, calculate a state of charge (SOC) indicating a remaining level of the first battery 50 on the basis of these detected values and then transmit the calculated SOC to the HV-ECU 200. The SOC is, for example, defined as 100% when the electrical storage device is in a fully charged state and defined as 0% when the electrical storage device is in a completely discharged state. It is possible to calculate the remaining level by various known methods using the voltage, charge/discharge currents, temperature, and the like, of the electrical storage device, so the detailed description thereof will not be made. In the following description, the SOC of the first battery 50 is referred to as SOC1, and the SOC of the second battery 60 is referred to as SOC2.

The B1 monitoring unit 500 may, for example, calculate a charging power limit value Win1 (hereinafter, also simply referred to as Win1) of the first battery 50 and a discharging power limit value Wout1 (hereinafter, also simply referred to as Wout1) of the first battery 50 on the basis of the SOC1, the current IB1, the voltage VB1, the battery temperature of the first battery 50 or an ambient temperature, and the like, and transmit the calculated Win1 and Wout1 to the HV-ECU 200. The SOC1, the Win1 and the Wout1 may be, for example, calculated by the HV-ECU 200.

The B2 monitoring unit 600 receives the detected current IB2 from the current sensor 602 and the detected voltage VB2 from the voltage sensor 604. The B2 monitoring unit 600 transmits these detected values to the HV-ECU 200. The B2 monitoring unit 600 may, for example, calculate the SOC2 on the basis of these detected values and then transmit the calculated SOC2 to the HV-ECU 200.

The B2 monitoring unit 600 may, for example, calculate a charging power limit value Win2 (hereinafter, also simply referred to as Win2) of the second battery 60 and a discharging power limit value Wout2 (hereinafter, also simply referred to as Wout2) of the second battery 60 on the basis of the SOC2, the current IB2, the voltage VB2, the battery temperature of the second battery 60 or an ambient temperature, and the like, and then transmit the calculated Win2 and Wout2 to the HV-ECU 200. The SOC2, the Win2 and the Wout2 may be, for example, calculated by the HV-ECU 200.

The HV-ECU 200 calculates a required control amount CHPW (that is, a required amount of charging power from the charging device 450) of the charging device 450 and a required control amount CHPWCNV (that is, a required amount of electric power supplied from the converter 10 to the first battery 50) of the converter 10 on the basis of information about the first battery 50, received from the B1 monitoring unit 500, and information about the second battery 60, received from the B2 monitoring unit 600. The HV-ECU 200 transmits the calculated required control amount CHPW of the charging device 450 to the charging device microcomputer 400. The HV-ECU 200 transmits the calculated required control amount CHPWCNV of the converter 10 to the MG-ECU 300.

The MG-ECU 300 generates a command signal for controlling the converter 10 on the basis of the required control amount CHPWCNV of the converter 10, received from the HV-ECU 200, and transmits the command signal to the converter 10.

The charging device microcomputer 400 generates a command signal for controlling the charging device 450 on the basis of the required control amount CHPW received from the HV-ECU 200, and transmits the generated command signal to the charging device 450.

In the present embodiment, when the vehicle 1 and the external power supply 710 are coupled by the charging cable 700, the control device 100 switches the CHR 72 from the off state to the on state, and charges the first battery 50 or the second battery 60 with the use of the charging device 450.

Figure 2:
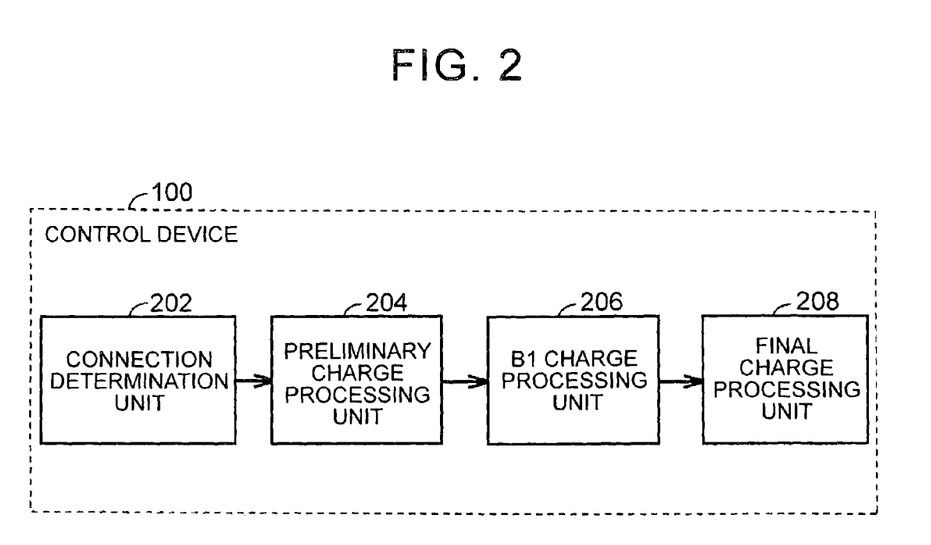
FIG. 2 is a functional block diagram of a control device mounted on the vehicle according to the embodiment.

FIG. 2 shows the functional block diagram of the control device 100 mounted on the vehicle 1 according to the present embodiment. The control device 100 includes a connection determination unit 202, a preliminary charge processing unit 204, a B1 charge processing unit 206 and a final charge processing unit 208.

A process in each of the connection determination unit 202, the preliminary charge processing unit 204, the B1 charge processing unit 206 and the final charge processing unit 208, for example, just needs to be executed in at least one of the HV-ECU 200, the MG-ECU 300 and the charging device microcomputer 400.

The connection determination unit 202 determines whether the connector 702 is connected to the inlet 456. The connection determination unit 202 may, for example, determine that the connector 702 is connected to the inlet 456 when the connection determination unit 202 receives a signal indicating that the switch is closed from the connector 702 or may determine that the connector 702 is connected to the inlet 456 when the connection determination unit 202 receives the pilot signal CPLT from the charging cable 700. The connection determination unit 202 may, for example, set a connection determination flag to an on state when the connection determination unit 202 has determined that the connector 702 is connected to the inlet 456.

The preliminary charge processing unit 204 executes preliminary charging process when the connection determination unit 202 has determined that the connector 702 is connected to the inlet 456. Specifically, the preliminary charge processing unit 204 switches the CHR 72 from the off state to the on state, and, when the voltage VB2 of the second battery 60 is lower than a threshold CP1, executes B2 charging process (1) until the voltage VB2 of the second battery 60 becomes higher than or equal to the threshold CP1.

When the B2 charging process (1) is executed, the first SMR 52 and the second SMR 62 both are in the off state. Therefore, electric power from the external power supply 710 is supplied to only the second battery 60.

The preliminary charge processing unit 204 may, for example, cause the CHR 72 to enter the on state when the connection determination flag is in the on state.

The B1 charge processing unit 206 executes B1 charging process for charging the first battery 50 when the CHR 72 is in the on state, the voltage VB2 of the second battery 60 is higher than or equal to the threshold CP1 and the SOC1 is lower than a threshold A.

Specifically, in this state, the B1 charge processing unit 206 sets the charging power of the charging device 450 to zero and switches both the first SMR 52 and the second SMR 62 from the off state to the on state. After that, the B1 charge processing unit 206 increases the charging power of the charging device 450, and executes B1 charging process for charging the first battery 50.

When the B1 charge processing unit 206 executes B1 charging process, the B1 charge processing unit 206 controls the converter 10 and the charging device 450 such that the first battery 50 is charged using the electric power of the second battery 60 and charging power from the charging device 450.

When the SOC1 becomes higher than or equal to the threshold A, the B1 charge processing unit 206 stops charging by setting the charging power of the charging device 450 to zero and ends the B1 charging process by switching both the first SMR 52 and the second SMR 62 from the on state to the off state. The B1 charge processing unit 206 may, for example, end the B1 charging process and set a B1 charge end flag to an on state.

The final charge processing unit 208 executes final charging process after the end of the B1 charging process. The final charge processing unit 208 may, for example, execute the final charging process when the B1 charge end flag is in the on state.

The final charge processing unit 208 executes the B2 charging process (1) when the voltage VB2 of the second battery 60 is lower than the threshold CP1 until the voltage VB2 of the second battery 60 becomes higher than or equal to the threshold CP1. When the B2 charging process (1) is executed, the first SMR 52 and the second SMR 62 both are in the off state. Therefore, electric power from the external power supply 710 is supplied to only the second battery 60.

The final charge processing unit 208 executes B2 charging process (2) when the voltage VB2 of the second battery 60 becomes higher than or equal to the threshold CP1. The B2 charging process (2) is a process of charging the second battery 60 at a charging power lower than that in the B2 charging process (1). Therefore, a variation in the voltage VB2 (that is, SOC2) of the second battery 60 at the time when the B2 charging process (2) is executed is gentler than a variation in the voltage VB2 of the second battery 60 at the time when the B2 charging process (1) is executed.

The final charge processing unit 208 executes the B2 charging process (2) until the voltage VB2 of the second battery 60 becomes higher than or equal to a threshold CP2. The threshold CP2 corresponds to the voltage VB2 in the case where the second battery 60 is in a fully charged state. The final charge processing unit 208 ends the final charging process by ending the B2 charging process (2) and causing the CHR 72 to enter the off state when the voltage VB2 of the second battery 60 becomes higher than or equal to the threshold CP2.

In the present embodiment, the connection determination unit 202, the preliminary charge processing unit 204, the B1 charge processing unit 206 and the final charge processing unit 208 all are described to function as software implemented by a CPU executing programs stored in a memory; instead, they may be implemented by hardware. Such programs are stored in a storage medium and mounted on the vehicle 1.

A control structure of the programs that are executed by the control device 100 mounted on the vehicle 1 according to the present embodiment will be described with reference to FIG. 3.

In step (hereinafter, step is abbreviated as "S") 100, the control device 100 determines whether the connector 702 of the charging cable 700 is connected to the inlet 456. When the connector 702 is connected to the inlet 456 (YES in S100), the process proceeds to S102. Otherwise (NO in S100), the process returns to S100.

In S102, the control device 100 switches the CHR 72 from the off state to the on state. In S104, the control device 100 determines whether the voltage VB2 of the second battery 60 is higher than or equal to the threshold CP1. When the voltage VB2 of the second battery 60 is higher than or equal to the threshold CP1 (YES in S104), the process proceeds to S106. Otherwise (NO in S104), the process proceeds to S108.

In S106, the control device 100 determines whether the SOC1 is lower than the threshold A. When the SOC1 is lower than the threshold A (YES in S106), the process proceeds to S110. Otherwise (NO in S106), the process proceeds to S118.

In S108, the control device 100 executes the B2 charging process (1). In S110, the HV-ECU 200 sets the charging power of the charging device 450 to zero, and causes both the first SMR 52 and the second SMR 62 to enter the on state. In S112, the control device 100 executes the B1 charging process.

In S114, the control device 100 determines whether the SOC1 is higher than or equal to the threshold A. When the SOC1 is higher than or equal to the threshold A (YES in S114), the process proceeds to S116. Otherwise (NO in S114), the process returns to S112.

In S116, the control device 100 sets the charging power of the charging device 450 to zero, and causes both the first SMR 52 and the second SMR 62 to enter the off state.

In S118, the control device 100 determines whether the voltage VB2 of the second battery 60 is higher than or equal to the threshold CP1. When the voltage VB2 of the second battery 60 is higher than or equal to the threshold CP1 (YES in S118), the process proceeds to S120. Otherwise (NO in S118), the process proceeds to S122.

In S120, the control device 100 determines whether the voltage VB2 of the second battery 60 is higher than or equal to the threshold CP2. When the voltage VB2 of the second battery 60 is higher than or equal to the threshold CP2 (YES in S120), the process proceeds to S124. Otherwise (NO in S120), the process proceeds to S126.

In S122, the control device 100 executes the B2 charging process (1). In S124, the control device 100 switches the CHR 72 from the on state to the off state. In S126, the control device 100 executes the B2 charging process (2).

Figure 4:
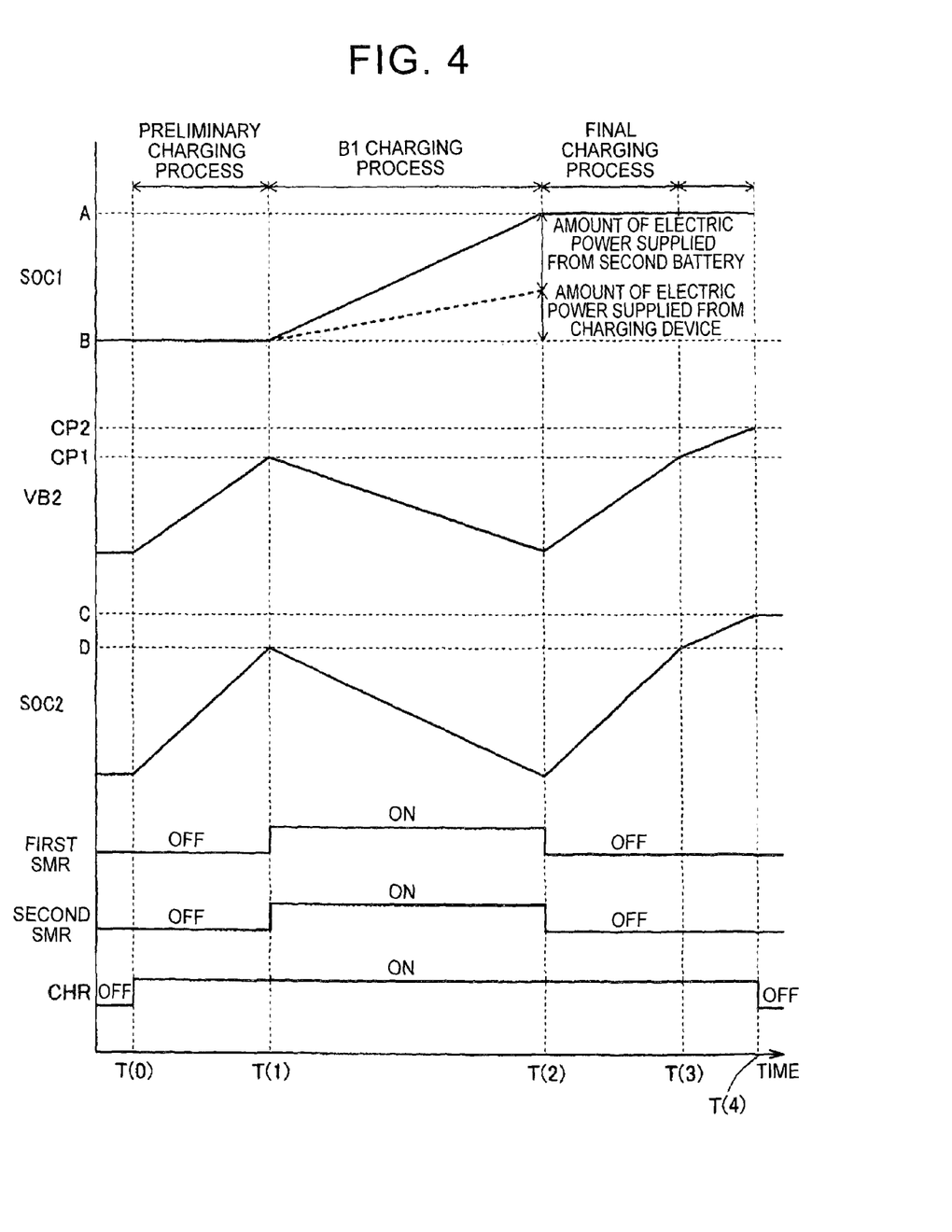
FIG. 4 is a timing chart that shows a charging operation of a plurality of electrical storage devices mounted on the vehicle according to the embodiment.

The operation of the control device 100 mounted on the vehicle 1 according to the present embodiment based on the above-described structure and flowchart will be described with reference to FIG. 4.

For example, the case where the SOC1 is B that is lower than the threshold A and the voltage VB2 of the second battery 60 is lower than the threshold CP1 is assumed. In addition, it is assumed that the connector 702 of the charging cable 700 is not connected to the inlet 456 and the first SMR 52, the second SMR 62 and the CHR 72 all are in the off state.

When a user connects the connector 702 to the inlet 456 at time T(0) (YES in S100), the CHR 72 is switched from the off state to the on state (S102). Because the voltage VB2 is lower than the threshold CP1 (NO in S104), the B2 charging process (1) is executed (S108). Through execution of the B2 charging process (1), the SOC2 increases with a lapse of time. The voltage VB2 also increases with an increase in the SOC2.

When the voltage VB2 becomes higher than or equal to the threshold CP1 at time T(1) (YES in S104), because the SOC1 is lower than the threshold A (YES in S106), the charging power of the charging device 450 is set to zero, and both the first SMR 52 and the second SMR 62 are switched from the off state to the on state (S110). When the voltage VB2 becomes the threshold CP1, the SOC2 becomes D.

Because both the first SMR 52 and the second SMR 62 enter the on state, electric power from the second battery 60 and electric power from the charging device 450 are supplied to the converter 10. As a result, the first battery 50 is charged using electric power from the second battery 60 and electric power from the charging device 450. Therefore, the SOC1 progressively increases after time T(1); whereas the SOC2 progressively reduces.

When the SOC1 becomes higher than or equal to the threshold A at time T(2) (YES in S114), the charging power of the charging device 450 is set to zero, and both the first SMR 52 and the second SMR 62 are switched from the on state to the off state (S116). At this time; the SOC1 becomes higher than or equal to the threshold A by the amount of electric power supplied from the charging device 450 and the amount of electric power supplied from the second battery after time T(1).

Because the voltage VB2 is lower than the threshold CP1 due to a decrease in the SOC2 (NO in S118), the B2 charging process (1) is executed (S122). Through execution of the B2 charging process (1), charging power is supplied from the charging device 450 to the second battery 60, so the second battery 60 is charged. After time T(2), the SOC2 increases and the voltage VB2 also increases because the second battery 60 is charged.

When the voltage VB2 becomes higher than or equal to the threshold CP1 (YES in S118) and is lower than the threshold CP2 (NO in S120) at time T(3), the B2 charging process (2) is executed (S126). A variation in the SOC2 and a variation in the voltage VB2 at the time when the B2 charging process (2) is executed are gentler than a variation in the SOC2 and a variation in the voltage VB2 at the time when the B2 charging process (1) is executed.

When the voltage VB2 becomes higher than or equal to the threshold CP2 at time T(4) (YES in S120), the CHR 72 is switched from the on state to the off state (S124). When the voltage VB2 becomes the threshold CP2, the SOC2 becomes C.

In this way, with the power supply system for a vehicle according to the present embodiment, it is possible to complete charging of the first battery 50 in a short period of time by charging the first battery 50 using electric power from the second battery 60 and electric power from the charging device 450 as compared to when the first battery 50 is charged with the use of only the charging device 450. Particularly, by reducing a period during which the converter 10 and the charging device 450 operate at the same time, it is possible to reduce the amount of loss produced in the converter 10, the charging device 450 and the auxiliaries during charging. Therefore, it is possible to improve charging efficiency. Thus, it is possible to provide the power supply system for a vehicle, which efficiently charges the plurality of electrical storage devices, mounted on the vehicle, in a short period of time with the use of the external power supply.

Furthermore, the second SMR 62 is provided on the converter 10 side with respect to the third connection node c of the positive electrode line PL3 with the other end of the positive electrode line PL4 and the fourth connection node d of the negative electrode line NL2 with the other end of the negative electrode line NL3. Therefore, by switching the second SMR 62 into the off state, it is possible to interrupt the electrical load or converter 10 from the charging device 450. Thus, when the second battery 60 is charged, it is possible to supply electric power, which is supplied from the charging device 450, to only the second battery 60. Therefore, it is possible to suppress a load on the converter 10 or the electrical load due to unnecessary application of voltage. As a result, it is possible to suppress degradation of components that constitute the electrical load or the converter.

In the present embodiment, the description is made on the case where the remaining level of the second battery 60, required to charge the first battery 50, is ensured when the voltage VB2 of the second battery 60 is higher than or equal to the threshold CP1; however, a determination method is not specifically limited to the configuration that the voltage VB2 is used. For example, it may be determined that the remaining level of the second battery 60, required to charge the first battery 50, is ensured when the SOC2 is higher than the threshold or it may be determined that the remaining level of the second battery 60, required to charge the first battery 50, is ensured when an open circuit voltage (OCV) of the second battery 60 is estimated and the estimated OCV is higher than or equal to a threshold.

An electrical storage device having a lower internal resistance characteristic is desirably selected as the second battery 60. With this configuration, it is possible to suppress the amount of loss produced in charging and discharging the second battery 60 and to further improve charging efficiency.

Next, an alternative embodiment to the present embodiment will be described. In the above-described embodiment, charging and discharging powers in each of the first battery 50 and the second battery 60 are not limited. However, actually, a response delay or a control interference may occur between the charging device 450 and the converter or a disturbance that fluctuates charging power may occur during charging with the use of the external power supply 710, so it can be required to limit the charging and discharging powers of each of the first battery 50 and the second battery 60.

The operation of the control device 100 of the vehicle 1 according to the alternative embodiment differs from the operation of the control device 100 of the vehicle 1 according to the above-described embodiment in that, when the first battery 50 is charged using the electric power of the second battery 60 and the electric power of the charging device 450, the converter 10 is controlled or the charging device 450 in addition to the converter 10 is controlled such that at least one of the discharging power limit value Wout2 of the second battery 60 and the charging power limit value Win1 of the first battery 50 is not exceeded.

Figure 5:
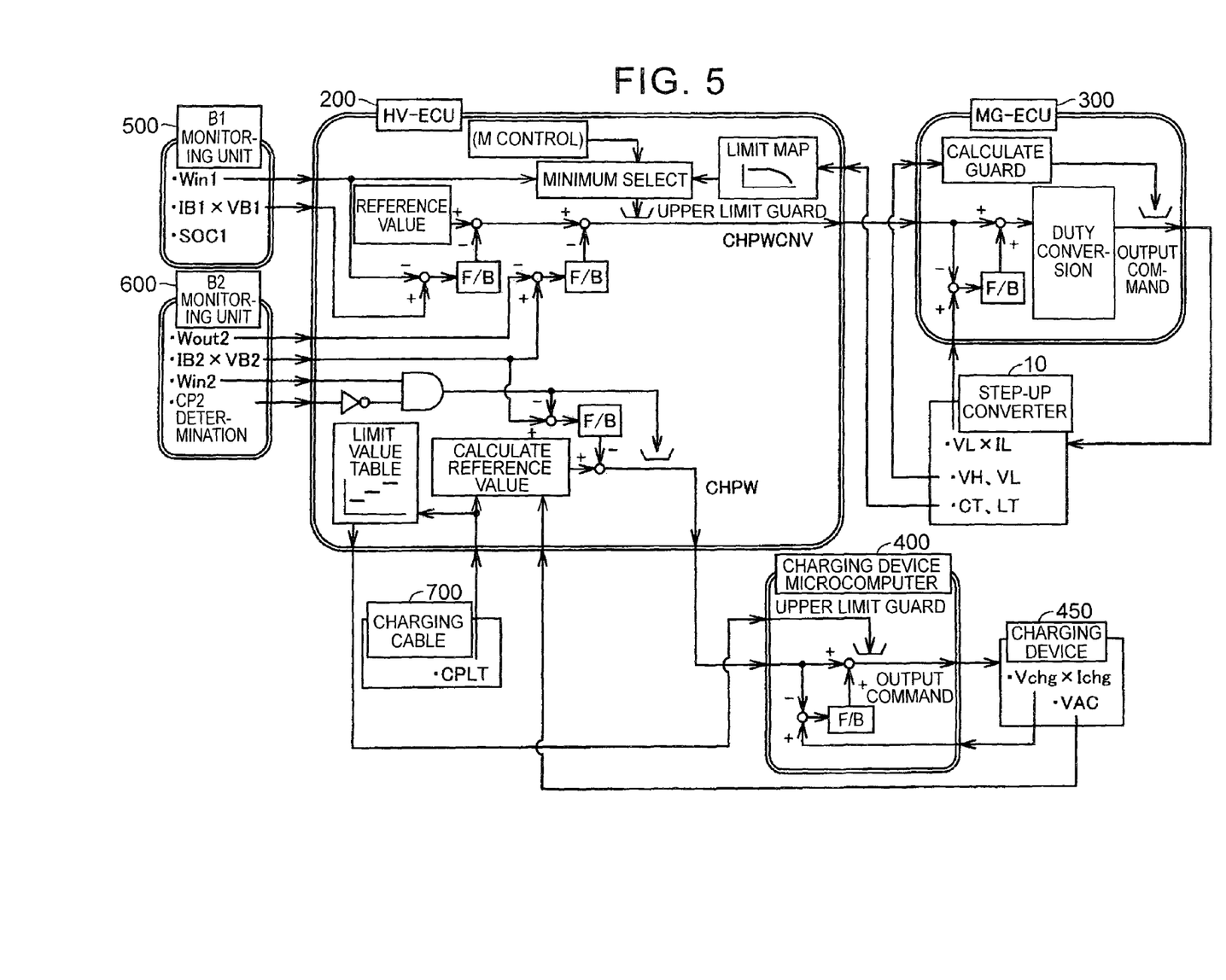
FIG. 5 is a view that shows a control flow of a charging operation that is executed in a vehicle according to an alternative embodiment to the embodiment.

As shown in FIG. 5, the HV-ECU 200 calculates the required control amount CHPWCNV of the converter 10, and transmits the calculated required control amount CHPWCNV to the MG-ECU 300. The MG-ECU 300 generates a command signal on the basis of the required control amount CHPWCNV received from the HV-ECU 200, and transmits the generated command signal to the converter 10.

On the other hand, the HV-ECU 200 calculates the required control amount CHPW of the charging device 450, and transmits the calculated required control amount CHPW to the charging device microcomputer 400. The charging device microcomputer 400 generates a command signal on the basis of the required control amount CHPW received from the HV-ECU 200, and transmits the generated command signal to the charging device 450.

More specifically, the HV-ECU 200 selects a minimum value from among the charging power limit value Win1 of the first battery 50, received from the B1 monitoring unit 500, a charging power limit value Winp of the first battery 50, calculated on the basis of a component protection requirement, a charging power limit value Winct of the first battery 50, determined on the basis of the converter temperature CT, and a charging power limit value Winlt of the first battery 50, determined on the basis of the reactor temperature LT, and determines the selected value as an upper limit value of the required control amount CHPWCNV.

The HV-ECU 200, for example, determines the limit value Winct on the basis of the converter temperature CT and a map that indicates the correspondence relationship between the converter temperature CT and the limit value Winct. The relationship between the converter temperature CT and the limit value Winct is, for example, a relationship such that the limit value Winct is constant at a predetermined value when the converter temperature CT is lower than a threshold, and is a relationship such that, when the converter temperature CT becomes higher than or equal to the threshold, the limit value Winct reduces as the converter temperature CT increases.

Similarly, the HV-ECU 200, for example, determines the limit value Winlt on the basis of the reactor temperature LT and a map that indicates the correspondence relationship between the reactor temperature LT and the limit value Winlt. The relationship between the reactor temperature LT and the limit value Winlt is, for example, a relationship such that the limit value Winlt is constant at a predetermined value when the reactor temperature LT is lower than a threshold, and is a relationship such that, when the reactor temperature LT becomes higher than or equal to the threshold, the limit value Winlt reduces as the reactor temperature LT increases.

The HV-ECU 200 determines a reference value of the required control amount CHPWCNV. The reference value is an initial value of the required control amount CHPWCNV when the first battery 50 is charged with the use of the external power supply 710, and is a value predetermined on the basis of the specifications, and the like, of the converter 10.

The HV-ECU 200 calculates a computed value obtained by subtracting a first feedback correction amount FB1 and a second feedback correction amount FB2 from the reference value. When the calculated computed value is smaller than the upper limit value of the above-described required control amount CHPWCNV, the HV-ECU 200 transmits the computed value to the MG-ECU 300 as the required control amount CHPWCNV. When the calculated computed value is larger than the upper limit value of the above-described required control amount CHPWCNV, the HV-ECU 200 transmits the upper limit value to the MG-ECU 300 as the required control amount CHPCNV.

The HV-ECU 200 calculates the first feedback correction amount FB1 on the basis of a value obtained by subtracting the charging power limit value Win1 of the first battery 50 from a value obtained by multiplying the current IB1 of the first battery 50 by the voltage VB1 of the first battery 50.

Furthermore, the HV-ECU 200 calculates the second feedback correction amount FB2 on the basis of a value obtained by subtracting the discharging power limit value Wout2 of the second battery 60 from a value obtained by multiplying the current IB2 of the second battery 60 by the voltage VB2 of the second battery 60.

When the HV-ECU 200 calculates the above-described first feedback correction amount FB1 and second feedback correction amount FB2, a third feedback correction amount FB3 (described later), a fourth feedback correction amount FB4 (described later) and a fifth feedback correction amount FB5 (described later), the HV-ECU 200 just needs to calculate the correction amounts in consideration of a proportional term and an integral term. A method of calculating the correction amounts in consideration of a proportional term and an integral term may be a known method, so the detailed description thereof will not be made.

The MG-ECU 300 calculates an upper limit value of a command signal (duty command value), which is transmitted from the MG-ECU 300 to the converter 10, on the basis of the voltage VL and the voltage VH. The upper limit value may be a predetermined value or may be calculated using a map, or the like, on the basis of a difference between the voltage VL and an allowable value and a difference between the voltage VH and an allowable value.

The MG-ECU 300 calculates the third feedback correction amount FB3 on the basis of a value obtained by subtracting the required control amount CHPWCNV from a value obtained by multiplying the voltage VL by the current IL. The MG-ECU 300 adds the third feedback correction amount FB3 to the required control amount CHPWCNV transmitted from the HV-ECU 200, and converts the resultant added value to the duty command value. The MG-ECU 300 may, for example, convert the added value to the duty command value using a predetermined map, or the like.

When the converted duty command value is smaller than the above-described upper limit value of the command signal, the MG-ECU 300 transmits the converted duty command value to the converter 10. When the converted duty command value is larger than or equal to the upper limit value, the MG-ECU 300 transmits the upper limit value to the converter 10 as the duty command value.

In the converter 10, on/off control is executed over the upper arm and the lower arm on the basis of the duty command value received from the MG-ECU 300.

On the other hand, the HV-ECU 200 calculates a reference value of the required control amount CHPW on the basis of the pulse width of the pilot signal CPLT received from the charging cable 700 and a voltage effective value calculated from the alternating-current voltage VAC received from the charging device 450. The HV-ECU 200 may, for example, calculate a reference value using a map that indicates a correspondence relationship among the pulse width of the pilot signal CPLT, the voltage effective value of the alternating-current voltage VAC and the reference value.

Furthermore, when the voltage VB2 of the second battery 60 is lower than the threshold CP1, the HV-ECU 200 calculates the fourth feedback correction amount FB4 on the basis of a value obtained by subtracting the charging power limit value Win2 of the second battery 60 from a value obtained by multiplying the current IB2 of the second battery 60 by the voltage VB2 of the second battery 60. When the voltage VB2 of the second battery 60 is lower than the threshold CP1, the HV-ECU 200 sets the charging power limit value Win2 of the second battery 60 as the upper limit value of the required control amount CHPW.

For example, when the voltage VB2 of the second battery 60 is higher than the threshold CP1 during operation of the converter 10, the HV-ECU 200 sets the upper limit value of the required control amount CHPW to zero until a predetermined period of time elapses from the timing at which it is determined that the voltage VB2 is higher than the threshold CP1.

The HV-ECU 200 calculates a computed value obtained by subtracting the fourth feedback correction amount FB4 from the calculated reference value. When the calculated computed value is smaller than the upper limit value, the HV-ECU 200 calculates the computed value as the required control amount CHPW. When the calculated value is larger than or equal to the upper limit value, the HV-ECU 200 calculates the upper limit value as the required control amount CHPW.

Furthermore, the HV-ECU 200 calculates an upper limit value of a command signal, which is transmitted from the charging device microcomputer 400 to the charging device 450, on the basis of the pilot signal CPLT, received from the charging cable 700, and a limit value table. The HV-ECU 200 transmits the calculated upper limit value to the charging device microcomputer 400.

The limit value table is a map that indicates a correspondence relationship between the pulse width of the pilot signal CPLT and the upper limit value, and is, for example, a correspondence relationship such that the upper limit value is increased in a stepwise manner as the pulse width of the pilot signal CPLT increases.

The charging device microcomputer 400 calculates the fifth feedback correction amount FB5 on the basis of a value obtained by subtracting the required control amount CHPW, received from the HV-ECU 200, from a value obtained by multiplying the voltage Vchg by the current Ichg, the voltage Vchg and the current Ichg being received from the charging device 450.

The charging device microcomputer 400 calculates a computed value obtained by adding the fifth feedback correction amount FB5 to the required control amount CHPW received from the HV-ECU 200. When the calculated value is smaller than the upper limited value calculated on the basis of the pilot signal CPLT and the limit value table, the charging device microcomputer 400 transmits the computed value to the charging device 450 as a command signal. When the calculated computed value is larger than or equal to the upper limit value, the charging device microcomputer 400 transmits the upper limit value to the charging device 450 as a command signal.

The charging device 450 supplies charging power based on the command signal received from the charging device microcomputer 400 to the first battery 50 or the second battery 60.

Figure 3:
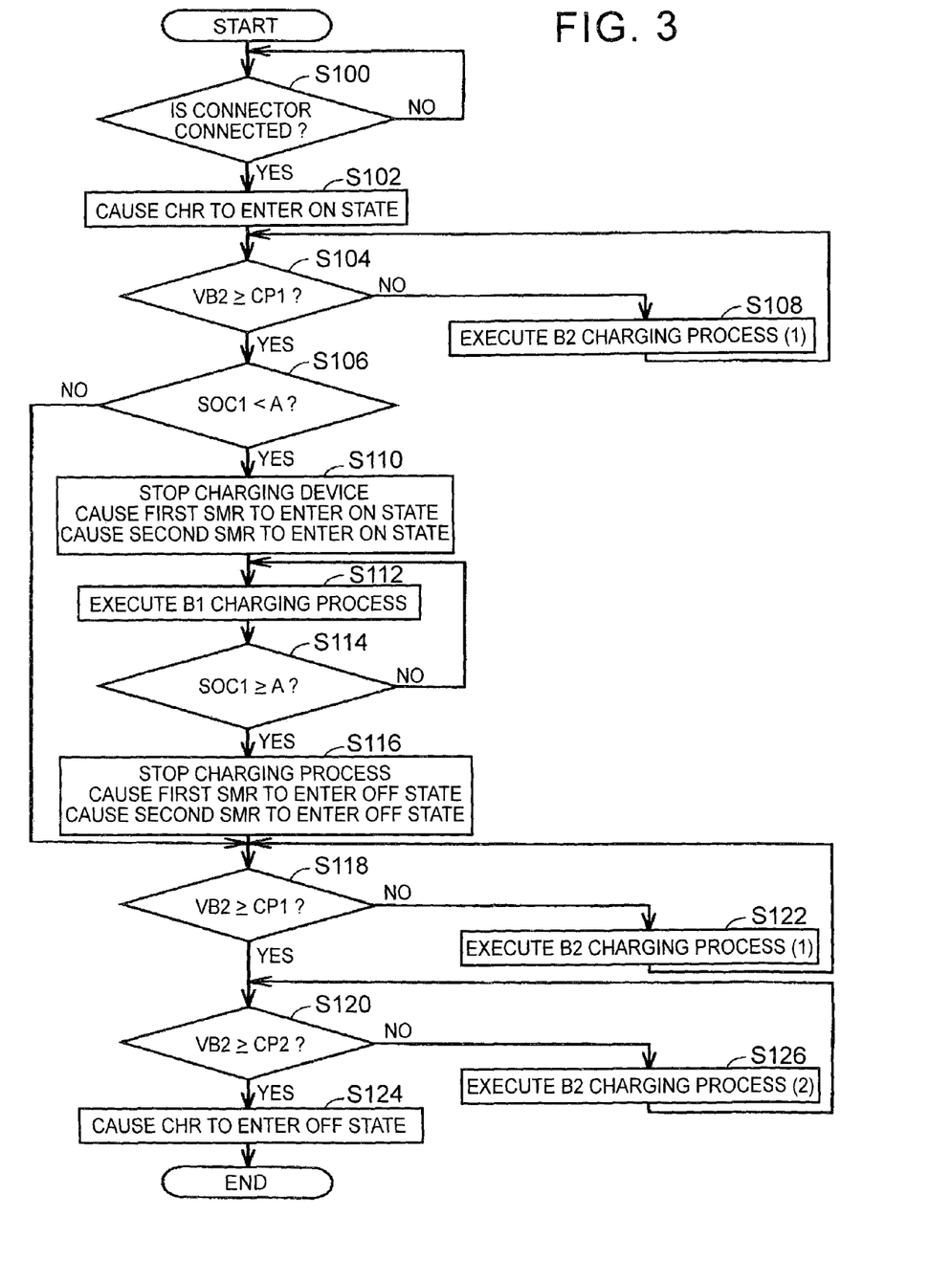
FIG. 3 is a flowchart that shows a control structure of programs that are executed by the control device mounted on the vehicle according to the embodiment.

The control structure of the programs that are executed by the control device 100 mounted on the vehicle 1 according to the present alternative embodiment differs from the flowchart shown in FIG. 3 according to the above-described embodiment in that the command signal to the charging device 450 or the command signal to the converter 10 is calculated as described above and a standby time of the predetermined period of time is provided when the device to be charged is switched (that is, when the states of the first SMR 52 and second SMR 62 are switched) at the time when each of the B1 charging process, the B2 charging process (1) and the B2 charging process (2) is executed, and the other processes are similar to those of the flowchart shown in FIG. 3. Therefore, the detailed description of the similar processes will not be repeated.

Figure 6:
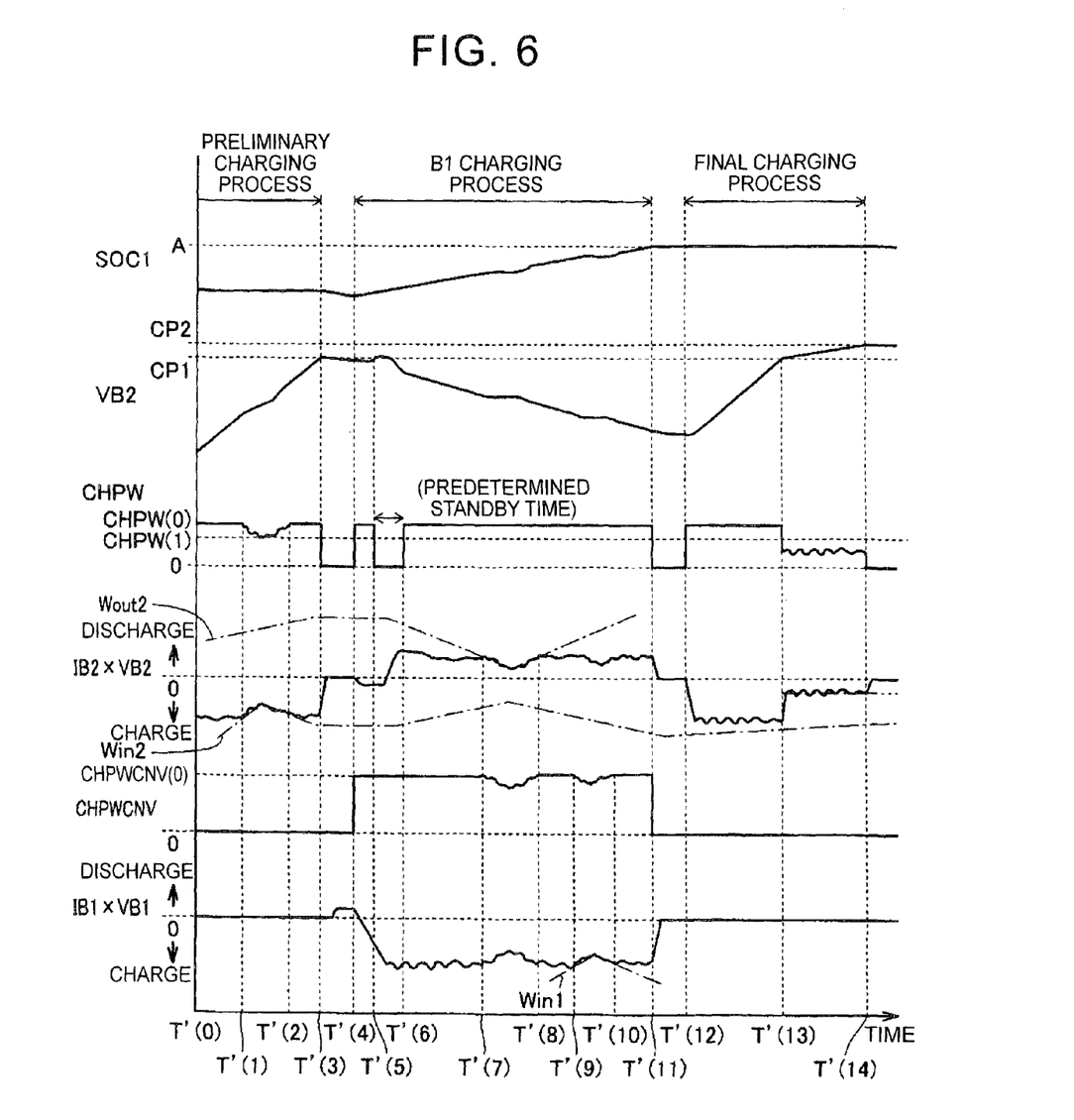
FIG. 6 is a timing chart that shows the charging operation of a plurality of electrical storage devices mounted on the vehicle according to the alternative embodiment to the embodiment.

The operation of the control device 100 mounted on the vehicle 1 according to the present alternative embodiment based on the above-described structure and flowchart will be described with reference to FIG. 6.

For example, the case where the SOC1 is lower than the threshold A and the voltage VB2 of the second battery 60 is lower than the threshold CP1 is assumed. In addition, it is assumed that the connector 702 of the charging cable 700 is not connected to the inlet 456 and the first SMR 52, the second SMR 62 and the CHR 72 all are in the off state.

When a user connects the connector 702 to the inlet 456 at time T'(0) (YES in S100), the CHR 72 is switched from the off state to the on state (S102). When the voltage VB2 is lower than the threshold CP1 (NO in S104), the B2 charging process (I) is executed (S108). Through execution of the B2 charging process (1), CHPW(0) is determined as the required control amount CHPW. Therefore, the SOC2 increases with a lapse of time. The voltage VB2 also increases with an increase in the SOC2.

At this time, the charging power limit value Win2 of the second battery 60 decreases with an increase in the SOC2 in order to avoid overcharging. After time T'(1), when the computed value obtained by subtracting the fourth feedback correction amount FB4 from the reference value is larger than the limit value Win2, the limit value Win2 is calculated as the required control amount CHPW. Therefore, the required control amount CHPW follows a variation in the limit value Win2. As a result, the required control amount CHPW decreases below CHPW(0), and decreases to CHPW (1) at timing at which the limit value Win2 becomes minimum.

When the limit value Win2 increases thereafter, the required control amount CHPW increases from CHPW(1) to CHPW(0) by following an increase in the limit value Win2.

When the limit value Win2 becomes larger than the computed value at time T'(2), the computed value is calculated as the required control amount CHPW. At time this, the required control amount CHPW returns to CHPW(0).

When the voltage VB2 of the second battery 60 becomes higher than or equal to the threshold CP1 at time T'(3) (YES in S104), because the SOC1 is lower than the threshold A (YES in S106), the required control amount CHPW is set to zero, and both the first SMR 52 and the second SMR 62 are switched from the off state to the on state (S110).

At time T'(4) after a lapse of a predetermined, period of time from when the required control amount CHPW is set to zero, the required control amount CHPW is increased to CHPW(0) based on the above-described computed value, and the operation of the charging device 450 is started. Furthermore, the required control amount CHPWCNV is increased to CHPWCNV(0), and the operation of the converter 10 is started.

Through the operation of the converter 10, the state of the first battery 50 changes from a discharging state to a charging state. On the other hand, due to a response delay until the first battery 50 changes from the discharging state to the charging state during the operation of the converter 10, the second battery 60 is temporarily charged with the use of the charging device 450. As a result, when the voltage VB2 of the second battery 60 exceeds the threshold CP1 at time T'(5), the required control amount CHPW becomes zero in order to avoid overcharging of the second battery 60, and the operation of the charging device 450 is stopped until a predetermined period of time elapses.

Through the operation of the converter 10, the first battery 50 changes from the discharging state to the charging state, and the second battery 60 changes from a charging state to a discharging state between time T'(5) and time T'(6). That is, the first battery 50 is charged with electric power that is supplied from the second battery 60 via the converter 10.

At time T'(6) at which the predetermined period of time has elapsed from when the operation of the charging device 450 is stopped, the required control amount CHPW becomes CHPW(0), and the operation of the charging device 450 is started. At this time, the first battery 50 is charged with electric power from the second battery 60 and electric power from the charging device 450.

In this way, because the first battery 50 is charged, the SOC1 progressively increases after time T'(4) at which the operation of the converter 10 is started; whereas the SOC2 progressively reduces.

When the charging power limit value Win2 of the second battery 60 and the discharging power limit value Wout2 of the second battery 60 reduce due to a factor, such as heat generated through discharging of the second battery 60, the second feedback correction amount FB2 increases. As a result, a value obtained by subtracting the first feedback correction amount FB1 and the second feedback correction amount FB2 from the reference value reduces, so the required control amount CHPWCNV decreases below CHPWCNV(0) after time T'(7).

After that, when the discharging power limit value Wout2 increases due to a decrease in the discharging amount of the second battery 60, cooling of the second battery 60, or the like, the second feedback correction amount FB2 reduces. Therefore, the required control amount CHPWCNV turns to an increase, and returns to CHPWCNV(0) at time T'(8).

The charging power limit value Win1 of the first battery 50 may reduce due to a factor, such as heat generated through charging of the first battery 50 and an increase in the SOC1. In this case, after time T'(9), when the computed value obtained by subtracting the first feedback correction amount FB1 and the second feedback correction amount FB2 from the reference value becomes larger than the limit value Win1 selected as the upper limit value, the limit value Win1 is calculated as the required control amount CHPWCNV. As a result, the required control amount CHPWCNV varies following a variation in the limit value Win1, so the required control amount CHPWCNV decreases below CHPWCNV(0).

When the limit value Win1 increases as a result of cancellation of the factor that reduces the limit value Win1 thereafter, the required control amount CHPWCNV increases following a variation in the limit value Win1. When the computed value obtained by subtracting the first feedback correction amount FB1 and the second feedback correction amount FB2 from the reference value becomes smaller than the limit value Win1 selected as the upper limit value at time T'(10), CHPWCNV(0) is determined as the required control amount CHPWCNV on the basis of the computed value.

When the SOC1 becomes higher than or equal to the threshold A at time T'(11) (YES in SI 14), the required control amount CHPW is set to zero, and both the first SMR 52 and the second SMR 62 are switched from the on state to the off state (S116).

At time T'(12) after a lapse of a predetermined period of time from when the required control amount CHPW is set to zero, the voltage VB2 is lower than the threshold CP1 due to a decrease in the SOC2 (NO in S118), so the B2 charging process (1) is executed (S122). Through execution of the B2 charging process (1), charging power is supplied from the charging device 450 to the second battery 60, so the second battery 60 is charged. After time T'(12), the SOC2 increases and the voltage VB2 also increases because the second battery 60 is charged.

When the voltage VB2 becomes higher than or equal to the threshold CP1 at, time T'(13) (YES in S118) and is lower than the threshold CP2 (NO in S120), the B2 charging process (2) is executed (S126).

Through execution of the B2 charging process (2), the SOC2 increases and the voltage VB2 also increases. The charging power that is supplied to the second battery 60 fluctuates with reference to a predetermined value lower than CHPW(0). Therefore, a variation in the voltage VB2 at the time when the B2 charging process (2) is executed is gentler than a variation in the voltage VB2 at the time when the B2 charging process (1) is executed.

When the voltage VB2 of the second battery 60 becomes higher than or equal to the threshold CP2 at time T'(14) (YES in S120), the CHR 72 is switched from the on state to the off state (S124).

In this way, with the power supply system for a vehicle according to the present alternative embodiment, in addition to the operation and advantageous effects described in the above-described embodiment, when the first battery 50 is charged using the electric power of the second battery 60 and the charging power of the charging device 450, the converter 10 is controlled such that electric power that is supplied from the converter 10 to the first battery 50 does not exceed the charging power limit value Win1 of the first battery 50. Furthermore, the converter 10 is controlled such that electric power that is supplied from the second battery 60 to the converter 10 does not exceed the discharging power of the second battery 60. Therefore, even when there occurs a disturbance, such as a power failure and a stop of the converter 10, usage of the first battery 50 and the second battery 60 over the allowable values of charging and discharging powers is suppressed, so it is possible to protect the first battery 50 and the second battery 60 by suppressing degradation of the first battery 50 and the second battery 60.

Furthermore, when the first battery 50 is charged, the charging device 450 and the converter 10 are independently controlled using the second battery 60 as a buffer of electric power. Thus, it is possible to suppress occurrence of control interference between the charging device 450 and the converter 10.

In the present embodiment, the required control amount CHPWCNV is calculated such that the discharging power of the second battery 60 does not exceed the limit value Wout2 by calculating the second feedback correction amount FB2 on the basis of the discharging power limit value Wout2 of the second battery 60 and the value obtained by multiplying the current IB2 by the voltage VB2. Instead, for example, the upper limit value of the required control amount CHPWCNV may be set on the basis of the discharging power limit value Wout2 of the second battery 60.

In the present embodiment, when the first battery 50 is charged with the electric power of the second battery 60 and the charging power of the charging device 450, the converter 10 is controlled such that the charging and discharging powers of the first battery 50 and second battery 60 do not exceed the allowable values; however, a control configuration is not specifically limited to this configuration. For example, when the first battery 50 is charged using the electric power of the second battery 60 and the charging power of the charging device 450, the charging device 450 may also be controlled in addition to the converter 10 such that the charging and discharging powers of the first battery 50 and second battery 60 do not exceed the allowable values. For example, the upper limit value of CHPW may be set on the basis of the upper limit of the required control amount CHPWCNV calculated by the HV-ECU 200 or the MG-ECU 300.

The invention claimed is:

1. A power supply system for a vehicle, the power supply system comprising:
    a first electrical storage device that is a power supply source to an electrical load, the electrical load being a drive source of the vehicle;
    a converter configured to bidirectionally adjust a voltage between the first electrical storage device and the electrical load;
    a second electrical storage device that is a power supply source connected to the electrical load in parallel with the converter;
    a charging device connected to the converter in parallel with the second electrical storage device, the charging device being configured to charge at least one of the first electrical storage device or the second electrical storage device by a power supply outside the vehicle; and
    a control device configured to control the converter such that the first electrical storage device is charged using electric power from both the second electrical storage device and the charging device, after the second electrical storage device is charged using electric power from the charging device.

2. The power supply system according to claim 1, wherein the control device is configured to control the converter such that at least one of an allowable value of discharging power of the second electrical storage device or an allowable value of charging power of the first electrical storage device is not exceeded, when the first electrical storage device is charged using electric power from both the second electrical storage device and electric power from the charging device.

3. The power supply system according to claim 1, wherein the control device is configured to charge the second electrical storage device by the charging device before the first electrical storage device is charged, when a remaining level of the second electrical storage device is lower than a threshold.

4. The power supply system according to claim 1, further comprising:
    a first switch configured to electrically interrupt the first electrical storage device from the converter when a remaining level of the first electrical storage device is higher than or equal to a threshold and the first electrical storage device is charged.

5. The power supply system according to claim 4, wherein the control device is configured to execute control with a standby time at the time when the first switch is switched to be disconnected or connected.

6. The power supply system according to claim 1, further comprising:
a second switch configured to electrically interrupt the charging device from the converter, when the second electrical storage device is charged by the charging device.

7. The power supply system according to claim 6, wherein the control device is configured to execute control with a standby time at the time when the second switch is switched to be disconnected or connected.

8. The power supply system according to claim 1, wherein the control device is configured to control the converter and the charging device such that at least one of an allowable value of discharging power of the second electrical storage device or an allowable value of charging power of the first electrical storage device is not exceeded, when the first electrical storage device is charged using electric power from both the second electrical storage device and electric power from the power supply outside the vehicle.

9. The power supply system according to claim 1, wherein the first electrical storage device is a secondary battery having a higher output density than the second electrical storage device, and the second electrical storage device is a secondary battery having a higher capacitance density than the first electrical storage device.

10. The power supply system according to claim 1, wherein the control device is configured to further charge the second electrical storage device by the charging device after the first electrical storage device is charged.

* * * * *